(12) United States Patent
Ellison et al.

(10) Patent No.: US 6,506,334 B1
(45) Date of Patent: *Jan. 14, 2003

(54) PROCESS AND APPARATUS FOR PREPARING A MOLDED ARTICLE

(75) Inventors: Thomas I. Ellison, Fort Mill, SC (US); Stephen P. McCarthy, Tynesboro, MA (US); Arthur K. Delusky, Detroit, MI (US)

(73) Assignee: The University of Massachusetts, Boston, MA (US)

( * ) Notice: Subject to any disclaimer, the term of this patent is extended or adjusted under 35 U.S.C. 154(b) by 29 days.

This patent is subject to a terminal disclaimer.

(21) Appl. No.: 09/668,829

(22) Filed: Sep. 22, 2000

(51) Int. Cl.⁷ .............................................. B29C 43/18
(52) U.S. Cl. .................. 264/510; 264/246; 264/266; 264/275; 264/322; 264/325; 425/112; 425/127; 425/508; 425/521; 425/412; 425/413

(58) Field of Search ................................ 264/510, 246, 264/320, 266, 275, 516, 325, 322; 425/112, 127, 521, 508, 413, 412

(56) References Cited

U.S. PATENT DOCUMENTS

| | | | |
|---|---|---|---|
| 5,453,240 A | | 9/1995 | D'Hooren |
| 5,885,691 A | | 3/1999 | Breezer et al. |
| 6,132,669 A | * | 10/2000 | Valyi et al. .................. 264/510 |

* cited by examiner

Primary Examiner—Leo B. Tentoni
Assistant Examiner—Edmund H. Lee
(74) Attorney, Agent, or Firm—Bachman & LaPointe, P.C.

(57) ABSTRACT

A film and heated plastic blank are sized to fit over a mold cavity and a combination of said film and blank formed. The combination is positioned over the mold cavity and formed in said mold cavity into the shape of said mold cavity.

31 Claims, 5 Drawing Sheets

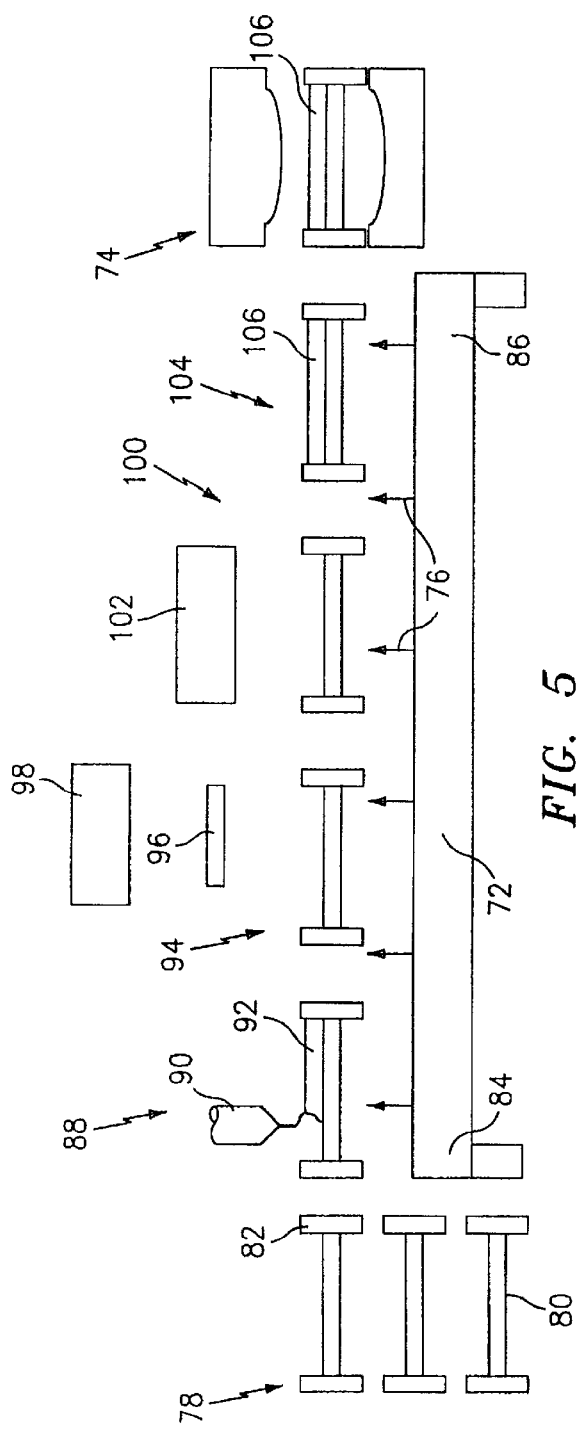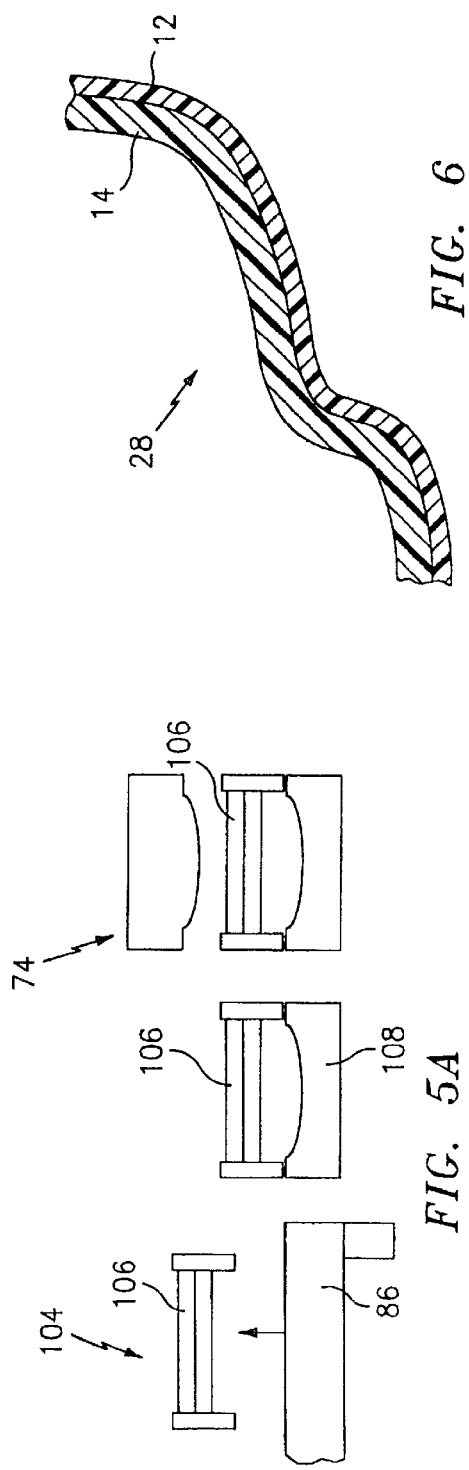

PROCESS AND APPARATUS FOR PREPARING A MOLDED ARTICLE

BACKGROUND OF THE INVENTION

In accordance with U.S. Pat. No. 5,401,457 for PROCESS FOR FORMING A COLOR COATED ARTICLE, By Emery I. Valyi, Patented Mar. 28, 1995, a process is provided for forming a color coated article. In accordance with the '457 patent, a film is placed substantially flat over a mold cavity and deformed by a core mold half and by molten plastic entering through a sprue.

An alternate method consists of thermoforming the film to nest accurately in the mold cavity, with said operation being carried out independently of the mold. The formed film insert is then brought to the mold and placed into the cavity. This procedure is described by Ch. Fridley, Avery Dennison, in Product Finishing, Apr. 19, 1992, and European Patent 0,442,128 to Beyer, and other publications. The Avery procedure entails a forming process of the film that is well known and widely practiced for other uses. It is a low pressure process for shaping the film or sheet, in solid condition, at relatively low temperatures. This holds for all of the several variants of thermoforming, such as vacuum forming, whether the vacuum is to suck the film into the cavity, or onto the core, as well as thermoforming followed by a sizing operation.

The result of this is a product whose dimensional accuracy and shape conformance is not within the range of a high pressure forming process, such as injection molding or compression molding. Consequently, the thermoformed preform, while nesting in the mold cavity or slipped over the core, fails to conform to them fully. Thus, upon injecting or compressing plastic behind the preform, the preform will deform producing localized surface imperfections. These imperfections may be dimensionally insignificant but optically discernible and therefore may provide a product of insufficient quality for an automotive finish, for example. In addition, the cost of a separately made film insert is relatively high, considerable trim scrap is generated, and the handling (transport, destacking, insertion) become expensive.

The procedure of the '457 patent overcomes the above defects; however, it is difficult to control, particularly when molding parts with large surfaces and sharply varying curvature. The difficulties increase when the plastic is pressure molded at high enough temperatures to reduce the film strength substantially, as in the case of conventional injection molding.

In applying either of the above processes to large, panel-like structures, it was found, moreover, that the procedure of injection molding of the '457 patent and Avery Dennison procedure referred to above, is difficult to carry out, requiring extremely costly equipment, and prone to produce imperfections at the interface between the film layer and the injected plastic.

U.S. patent application Ser. No. 09/130,864 by Valyi, Delusky, Ellison and Rees, filed Aug. 7, 1998 represents an improvement over the foregoing procedures and prepares a color coated article by depositing molten plastic on a film and forming the film-molten plastic combination in a mold cavity. This procedure and the resultant article effectively and efficiently forms a color coated article. However, it would be particularly desirable to further improve the foregoing procedure.

Accordingly, it is a principal object of the present invention to provide a process and apparatus which conveniently and expeditiously forms a molded article from plastic and a film insert, wherein the film is the outer layer of the molded article and wherein desirably the film is colored.

It is a further object of the present invention to provide a process and apparatus as aforesaid which represents an improvement over the foregoing procedures and provides a commercially feasible process and apparatus for forming a color coated article.

It is a still further object of the present invention to provide a process and apparatus as aforesaid which is operative under conditions that are sufficiently controllable and cost efficient to produce complex parts, particularly those of a size of major body components of passenger cars.

Further objects and advantages of the present invention will appear hereinbelow.

SUMMARY OF THE INVENTION

In accordance with the present invention, the foregoing objects and advantages are readily obtained.

The present invention provides a process for preparing a molded article, which comprises: providing a mold cavity, a film desirably a colored film, and a heated plastic blank, wherein said film and blank are sized to fit over said mold cavity; forming a combination of said film and blank with said blank positioned on said film; positioning said combination over said mold cavity with said film located in a position closer to the mold cavity than said blank, and holding said combination over said mold cavity; and forming a molded article in the shape of said mold cavity, wherein said film is an outer layer of the molded article.

Thus, the resultant article is desirably a molded, color coated article having a desired shape, which may be a complex shape, as defined by the shape of mold cavity. Naturally, the mold may include other components, such as slides and lifters which are well known.

The present invention also provides an apparatus for preparing a molded article, which comprises: a mold cavity; a combination of a film and a heated plastic blank, wherein said blank is positioned on said film and wherein said blank and film are sized to fit over said mold cavity; means for positioning said combination over said mold cavity with said film located in a position closer to the mold cavity than said blank; means to hold said combination over said mold cavity; and means to form said combination into a molded article in said mold cavity in the shape of said mold cavity, wherein said film is an outer layer of the molded article.

The present invention adheres to the principle of forming the film in uniformity with the plastic that backs same, and thereby to effect full shape conformance without optically discernable flaws of the exposed film surface, which may be a paint film, and to form the resultant molded article under closely controlled conditions of temperature distribution and pressure in an efficient manner.

In addition, the present invention achieves the foregoing in a convenient and expeditious manner without problems noted heretofore.

Further specific features and advantages of the present invention will appear hereinbelow.

BRIEF DESCRIPTION OF THE DRAWINGS

The present invention will be more readily understood from a consideration of the following drawings wherein:

FIGS. 4A, 4B, 5 and 5A are partly schematic views showing variations in the process and apparatus of the present invention; and FIG. 6 shows a partial sectional view of a representative molded article prepared in accordance with the present invention.

DETAILED DESCRIPTION OF PREFERRED EMBODIMENTS

Polymer resin in sheet form is cut to register with the footprint of a part to be molded. The die cut blank is heated to a temperature sufficient to bond to a selected paint film and form with compression. This temperature will usually be the melting temperature or greater for the resin. It may be less than the melting temperature, as when the bond surface of the film finish is coated with a heat-activated adhesive. In that instance, the resin blank is heated at least to the heat activation temperature of the adhesive. The resin blank is at least as thick as the final part. It may be thicker to provide material for bosses or ribs and to fill out the part for undersized blanks. The blank may be heated by infrared, convection, RF or any heating means that will bring the resin blank to the desired temperature.

The heated blank is placed onto a film finish and the combination positioned over the cavity of a mold set. Compression pressure is applied to form the part. Reinforcements or other insert materials may be incorporated into the molding. In one instance the reinforcement (synthetic, natural, glass, or metal fiber—woven or non-woven) is placed on top of the heated blank either before or after it is placed on the film. In a second instance, the two or more inserts are incorporated in a sequential lay up of resin blanks either before placement on the film or after the first layer is applied and subsequent layers are placed in sequence.

The blank may desirably be placed on the film starting at one edge and continuing to the distant edge in a rolling action to eliminate air entrapment and to form a combination of a resin blank and film. This combination is then positioned over the mold cavity and the molded part formed. Further features and variations will be discussed hereinbelow.

Figure 1:
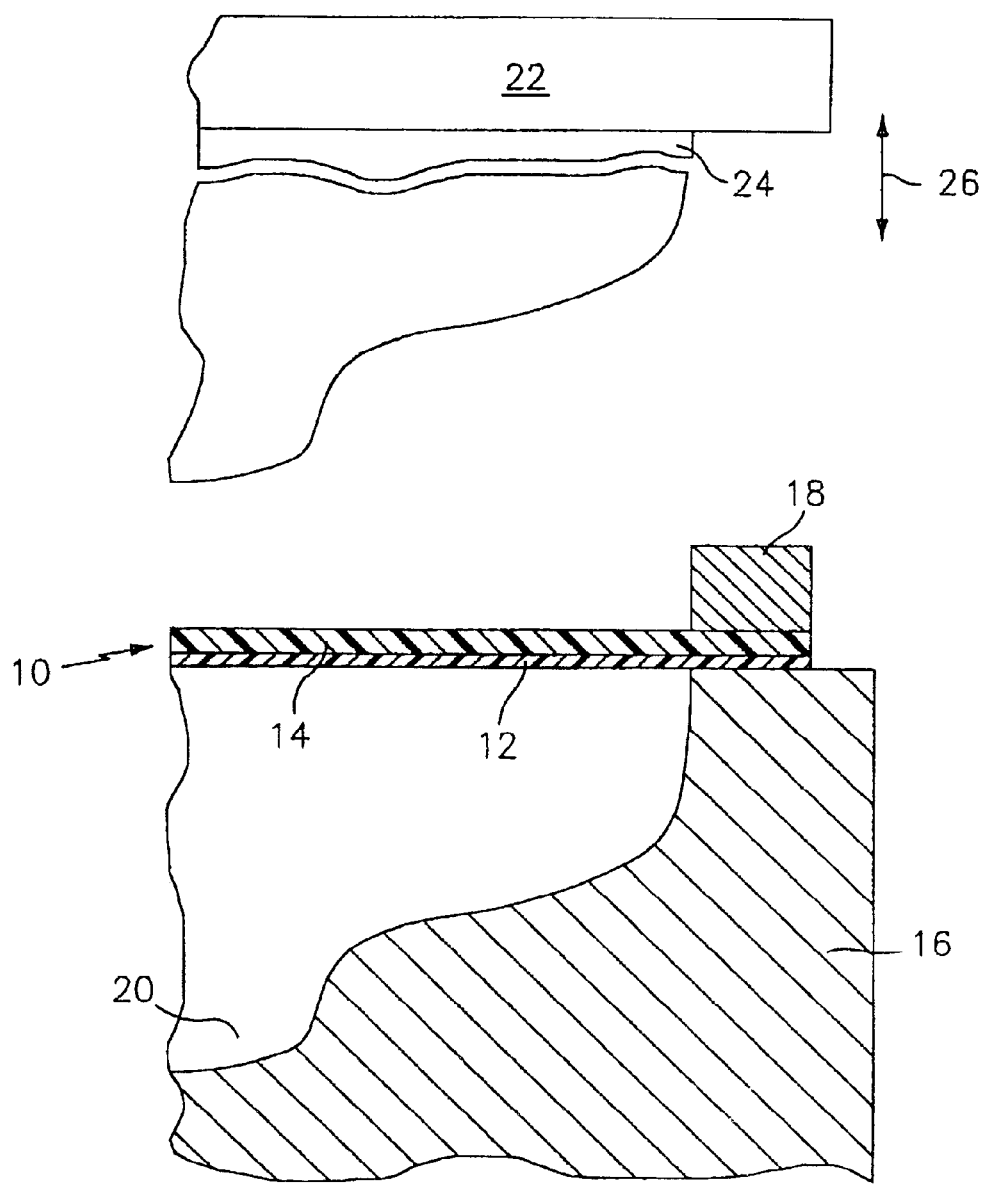
FIG. 1 is a partly schematic view showing one embodiment of the preparation of the molded article of the present invention.

In accordance with the illustrative embodiment of FIG. 1, a combination 10 of film 12 and heated plastic blank 14 is held over mold 16 by clamping frame 18. Mold 16 includes mold cavity 20 which forms the desired shape of the resultant molded article. Film 12 is desirably a colored film which forms the exterior surface of the final molded article, although the film may be a composite film with a colored exterior surface, or a composite film with a clear external film surface and a colored interior film surface. The film and blank are sized to fit over the mold cavity, as with a slight overlap as shown in FIG. 1.

Platen 22 is shown with a forming mandrel 24 which desirably is a solid metal mandrel but which may also for example be an elastomeric mandrel, and which may if desired contain air slots and pressure control means connected thereto to aid in the forming procedure.

Mold cavity 20 forms the shape of the desired molded article and naturally any desired mold cavity shape can be used. In addition, if desired, one could texture the mold surface to have a desired textured finish on the final product.

In operation, the mandrel 24 moves downward in the direction of arrow 26, engaging combination 10 and conforming same to the shape of the mold cavity. A representative molded article 28 is shown in FIG. 6 with film 12 forming the outside of the molded article and blank 14 forming the inside. Naturally, any desired shape may be obtained. The resultant molded article 28 has the desired shaped configuration determined by the shape of the mold cavity. Moreover, advantageously, despite the forming operation, the colored film layer is characterized by color uniformity and a color coated article is formed in a simple and convenient manner.

Figure 2A:
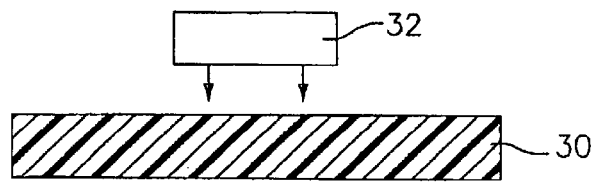
FIGS. 2A, 2B and 2C are partly schematic views showing the process and apparatus of the present invention.
Figure 2B:
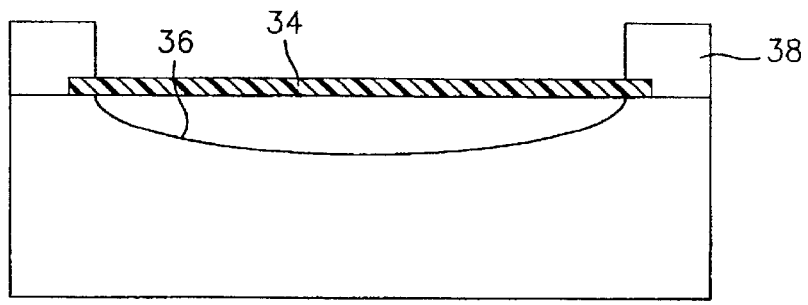
Figure 2C:
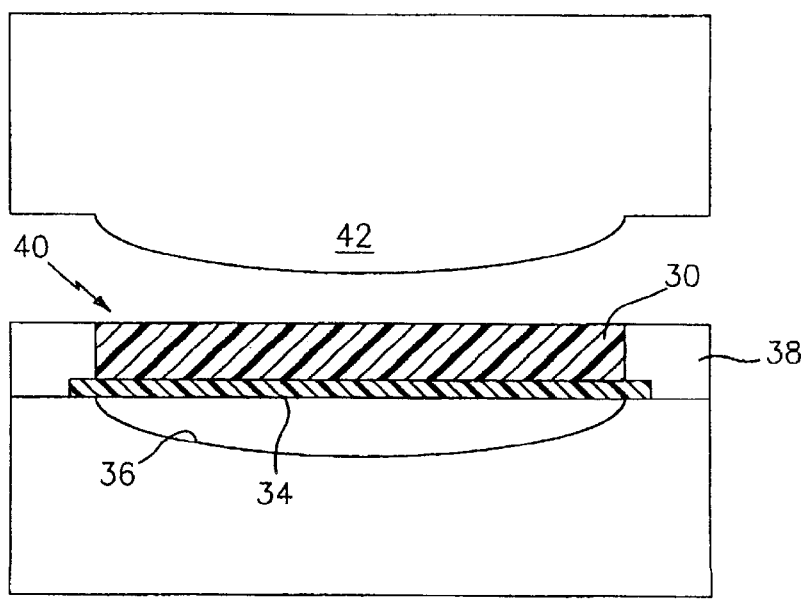

In accordance with the present invention, a plastic blank is provided sized to fit over the mold cavity. A representative blank 30 is shown in FIG. 2A. The blank 30 may be heated to a desired temperature by any suitable heat source 32 as indicated hereinabove. Film 34 also sized to fit over mold cavity 36 may be held over mold cavity 36 as by clamps 38 as shown in FIG. 2B and the heated blank 30 placed thereon to form a combination 40 of film 34 and heated blank as shown in FIG. 2C. The resultant molded article is then formed by mandrel 42 conforming combination 40 to the shape of mold cavity 36.

The combination 40 may be formed by placing the heated resin blank on the film while the film is positioned over the mold cavity, as shown in FIG. 2C, or desirably the combination may be formed in a position spaced from the mold cavity. The combination of heated resin blank and film may then be transferred to a position over the mold cavity as shown in FIG. 2C.

The blank and film are plastic, and any desired plastic material may be used, for example, polyolefins, polyurethanes, acrylonitrile butadiene styrene (ABS), polyvinyl chloride, polystyrene, polycarbonates, polyesters, etc., and desirable blends of the foregoing. The colored layer may be directly coated on the film or blank or may be a separate layer as a colored plastic film layer. The blank and film may be the same or different materials. If the same materials are used, one can obtain melt bonding between the materials. If different materials are used, one can achieve a mechanical bond, or adhesive bonding can be used. The layers may be cut or stamped from a web and a supply having the size and shape to fit over or into the mold cavity maintained adjacent the mold for transfer to the mold as needed and the colored layer coated on the film. The depth of color on the colored layer may be varied to at least partially accommodate thinning during processing and to at least partially adjust the color depth to the amount of deformation any given portion will undergo. Thus, for example, thicker paint coatings may be applied to selective locations that are to obtain greater deformation during processing in order to at least partially obtain uniformity of color in the final molded product.

A significant and highly advantageous feature of the present invention is to provide a combination of film and heated plastic blank and positioning same over the mold cavity. This provides considerable versatility in processing and results in an effective and efficient process and apparatus.

The present invention contemplates variations in the operation and components. Thus, for example, the resin blank 14 may be unfilled or additives thereto provided, as with one or more fillers as desired, as for example one or more of the following: glass beads, glass fibers, carbon fibers, talc, mica, metal particles or metal fibers, clay, natural fibers, liquid crystal fibers, mineral fillers, carbon black, or molding fillers. The resin blank with or without additives may then be processed in accordance with the present invention.

Similarly, reinforcements to the resin blank may be used as shown for example in FIGS. 3A–3E.

Thus, in accordance with the present invention, a reinforcing material may be adhered to and/or at least partly embedded in the inner surface of the film or blank in order to eliminate or significantly minimize the color thinning or to provide a reinforced final product. Desirably, the reinforcing material is a textile material, synthetic or natural. However, one could readily use a fiberglass mat or scrim or a random fiberglass material, or metal or additional plastic. The metal should be a metal mesh or metal which will elongate or form under pressure. The plastic should be selected to have a tensile strength at the forming temperature sufficient to distribute the forming forces. The fiberglass mat or scrim is desirably knitted. This will effectively reinforce the film without jeopardizing the color tones of the color-coated film and without interfering with the forming operation. The reinforcing material serves to distribute the elongating forces produced by the engagement with the most protruding areas of the mold core.

Figure 3A:
FIGS. 3A, 3B, 3C, 3D and 3E show variations of the plastic blank.
Figure 3B:
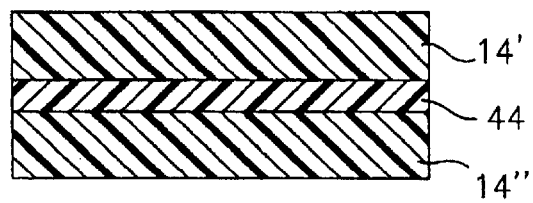
Figure 3C:
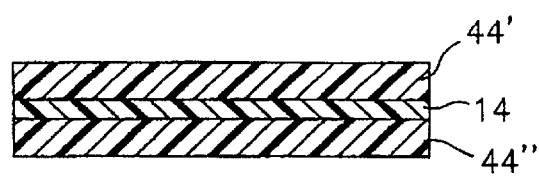
Figure 3D:

FIG. 3A shows a resin blank 14 with reinforcing material 44 adhered to the inner surface thereof. FIG. 3B shows two resin blank layers 14' and 14" with reinforcing material 44 sandwiched therebetween, and FIG. 3C shows two reinforcing layers 44' and 44" with resin blank layer 14 sandwiched therebetween. FIG. 3D shows resin blank 14 with a registered reinforcement 46 positioned to register with selected area(s) of the resin blank where different resin or reinforcing layers are used, these layers may be the same or different materials.

Figure 3E:

Alternatively, FIG. 3E shows a resin blank 14 with extra resin 48 to provide added material for a boss or a rib, or the like, with the added resin registered at a desired location.

The embodiments of FIGS. 3A–3E may be advantageously processed in accordance with the present invention.

Figure 4A:
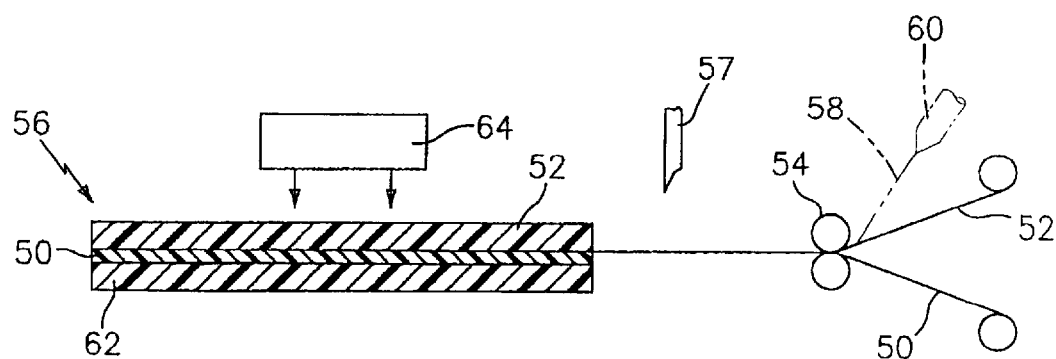
Figure 4B:
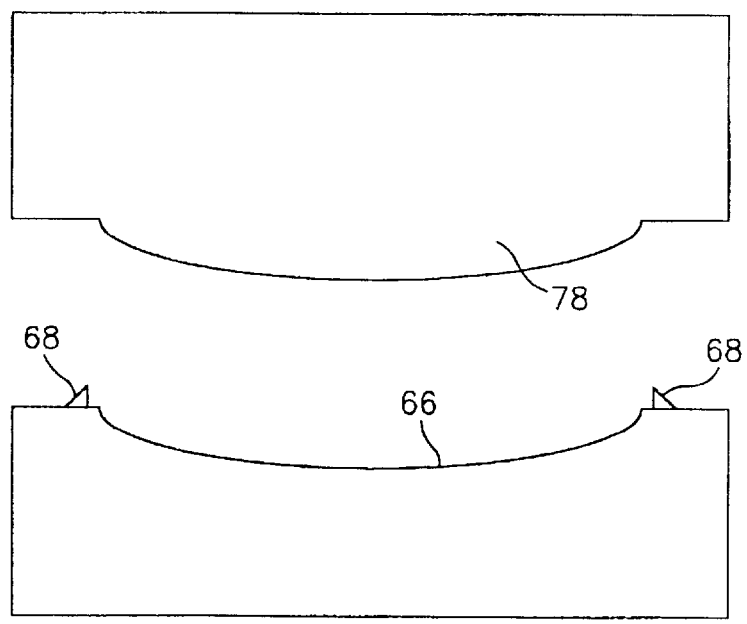

FIGS. 4A, 4B and 5 show further variations of the present invention.

FIG. 4A shows the preparation of the combination of resin blank and film outside of the mold cavity at a position spaced therefrom, heated outside of the mold cavity, and subsequently placed over the mold cavity.

Thus, as shown in FIG. 4A, a film finish 50 and resin blank 52 are separately fed through rollers 54 to form combination 56 with the components sized to fit over the mold cavity by cutters 57, as shown. The resin blank may be pre-extruded resin sheet 52 or a resin 58 extruded in line from extruder 60. Combination 56 may if desired include a removable film 62 for ease in handling which is removed when the combination is placed over the mold cavity. Heating means 64 is then provided to heat combination 56 as desired.

Combination 56 is then placed over mold cavity 66, with the sized combination held in place by retainer pins 68, to form a molded article by mandrel 70. Naturally, other devices may be used to hold the sized combination in place during the forming operation, such as those discussed above.

FIG. 5 shows a further embodiment of the present invention which involves a continuous process for the preparation of the molded article including the preparation of sized film and heated plastic blank with or without reinforcements or other components.

Thus, in accordance with FIG. 5, an air support table 72 is provided adjacent mold 74 with means therein for providing supportive air flow 76 above table 72. As shown in FIG. 5, a stack 78 of sized film blanks 80 mounted in carrier frames 82 is provided adjacent air support table 72. Each film blank is transferred by a suitable transfer means (not shown) to a position over the leading end 84 of table 72 which is spaced from mold 74. Each film blank is processed during transfer from the leading end 84 of table 72 to trailing end 86 of table 72 which is situated adjacent mold 74. At a first station 88, an extruder 90 deposits a first heated resin 92 on film 80 while the film is supported by air flow 76. Other means can of course be used to provide the first resin deposit, as for example, a mandrel with shooting pots. Naturally, the first resin can be a mixture of resins. The resultant combination is moved to second station 94 where a heated, sized plastic blank 96 is deposited on the combination, heated in cover 98. Alternatively, the first station can be omitted and the heated blank 96 deposited directly on film blank 80, or stations 1 and 2 can be reversed to first apply the heated blank and second apply the extruded resin.

The optional third station 100 applies a heated reinforcement from cover 102, and the fourth station 104 holds the combination 106 for transfer to mold 74 for forming, as in previous embodiments.

Naturally, the order of the process steps can be reversed, or steps combined, depending on particular requirements. The air flow 76 provides support for the combination while it is being transferred to the mold.

In the variation of FIG. 5A, at least one mold cavity 108 is provided downstream of the fourth station 104 or at the fourth station 104. Preferably a plurality of these mold cavities 108 are provided and preferably they are movable. Thus, the combination 106 may be applied to a mold cavity outside of mold or clamping press 74. The mold cavity plus combination can then be shuttled into the clamping press and the core half closed against the cavity to mold the part. If only one cavity is used, this procedure allows easy access to the cavity for mounting the combination outside of the confined area of the clamping press. Process cycle time is reduced and can be further reduced if multiple cavities are used. Preparation for molding one part, i.e., loading the film, resin and reinforcement if used, can take place while the preceding part is cooling in a closed clamping press.

The foregoing process represents an improved and streamlined method and apparatus for forming large, panel-like, thick parts because it overcomes the difficulty of heating a thick plate uniformly and provides a system well suited for a commercial operation. It is useful, whether a colored or painted film is required or not. Any plastic film or a plurality of films may be used as a support of the hot plastic so long as it is compatible with the plastic to be molded. The compatibility may be achieved by a variety of methods, such as melt bonding, use of adhesives or tie layers. Alternatively, in some cases one could use a non-compatible or removable film layer. Moreover, numerous variations may be readily contemplated, as for example, the use of multiple layers of materials, a variety of types of films as a conductive film, a film with UV and/or infrared absorption characteristics, or different components or additives to obtain specific desired properties, all within a convenient and expeditious operation.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Process for preparing a molded article, which comprises:
   providing a mold cavity, a film and a heated plastic blank, wherein said film and blank are sized to fit over said mold cavity, wherein said sized plastic blank is heated at a position spaced from said film and placed on said film in the heated condition;
   forming a combination of said film and blank with said blank positioned on said film;
   positioning said combination over said mold cavity with said film located in a position closer to the mold cavity than said blank, and holding said combination over said mold cavity; and
   forming said combination into a molded article in said mold cavity in the shape of said mold cavity, wherein said films is an outer layer of the molded article.

2. Process according to claim 1, wherein said plastic blank is in the molten condition.

3. Process according to claim 1, including the step of heating said blank with a heat source.

4. Process according to claim 1, wherein the film is colored.

5. Process according to claim 1, including the step of placing said film over the mold cavity and placing a heated blank over the mold cavity to form said combination.

6. Process according to claim 1, including the step of forming said combination in a position spaced from said mold cavity.

7. Process according to claim 1, including the step of including additives in the plastic blank.

8. Process according to claim 1, including the step of providing a reinforcing material engaging the blank.

9. Process according to claim 1, including the step of providing additional resin engaging the resin blank and located at a desired location.

10. Process according to claim 1, wherein the combination is formed by feeding said film and blank through rollers, cutting the combination to size, and heating said combination at a location spaced from said mold cavity.

11. Process according to claim 1, including holding the combination over said mold cavity by holding means.

12. Process according to claim 1, including the continuous preparation of molded articles.

13. Process according to claim 1, including the step of applying heated plastic to a sized film while the film is held spaced from said mold cavity.

14. Process according to claim 13, including holding the combination over an air table with air flow to support said combination while said combination is spaced from the mold cavity.

15. Process according to claim 13, including sequentially applying at least one of (1) a second heated plastic and (2) a reinforcement, to said combination while said combination is spaced from the mold cavity.

16. Process according to claim 1, including positioning said combination over a mold cavity at a first location and forming said molded article at a second location downstream of said first location.

17. Apparatus for preparing a molded article, which comprises:
   a mold cavity;
   a combination of a film and a heated plastic blank, wherein said blank is positioned on said film and wherein said film and blank are sized to fit over said mold cavity, including means for heating said sized plastic blank at a position spaced from said film, and means for placing said heated sized plastic blank on said film;
   means for positioning said combination over said mold cavity with said film located in a position closer to the mold cavity than said blank;
   means to hold said combination over said mold cavity; and
   means to form said combination into a molded article in said mold cavity in the shape of said mold cavity, wherein said film is an outer layer of the molded article.

18. Apparatus according to claim 17, including a heat source for heating said blank.

19. Apparatus according to claim 17, wherein the film is colored.

20. Apparatus according to claim 17, including forming means for forming said combination at a location spaced from said mold cavity.

21. Apparatus according to claim 17, including holding means for holding said combination over said mold cavity.

22. Apparatus according to claim 17, including means for applying heated plastic to a sized film while the film is held spaced from said mold cavity.

23. Apparatus according to claim 22, including an air table with air flow thereabove for supporting said combination while said combination is spaced from the mold cavity.

24. Apparatus according to claim 22, including means for sequentially applying at least one of (1) a second heated plastic and (2) a reinforcement, to said combination while said combination is spaced from the mold cavity.

25. Apparatus according to claim 17, wherein said means for positioning is at a first location and said means to form is a second location downstream of said first location.

26. Process according to claim 1, including the step of forming a combination of said film and a mixture of resins comprising said plastic blank.

27. Process according to claim 1, including the step of forming a combination of said film and at least two plastic layers comprising said plastic blank.

28. Process according to claim 1, including the step of extruding at least one plastic layer over said film to form said combination.

29. Apparatus according to claim 17, including means for positioning a combination of said film and a mixture of resins comprising said plastic blank over said mold cavity.

30. Apparatus according to claim 17, including means for positioning a combination of said film and at least two plastic layers comprising said plastic blank over said mold cavity.

31. Apparatus according to claim 17, including extrusion means for extruding at least one plastic layer over said film to form said combination.

* * * * *